Sept. 8, 1931.　　　　W. WALTY　　　　1,822,255
AUTOMATIC SWITCH
Filed April 24, 1925
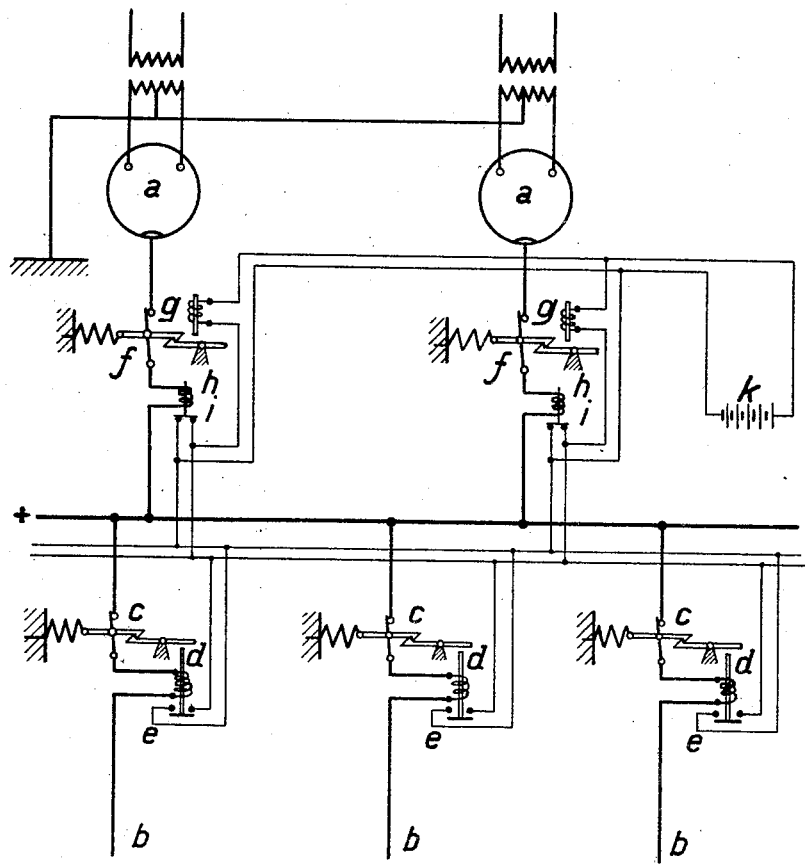

Patented Sept. 8, 1931

1,822,255

UNITED STATES PATENT OFFICE

WERNER WALTY, OF ENNETBADEN, SWITZERLAND, ASSIGNOR TO AKTIENGESELL-SCHAFT BROWN, BOVERI & CIE., OF BADEN, SWITZERLAND

AUTOMATIC SWITCH

Application filed April 24, 1925, Serial No. 25,564, and in Germany April 28, 1924.

My invention relates to electrical distribution systems and it has particular relation to the selective operation of circuit breakers interconnecting the power generating apparatus with the transmission lines distributing said power.

Among the objects of my invention is the provision of a system of the above described character in which a pair of serially-disposed circuit breakers interconnecting the power generating translating apparatus and the load, for instance, are so interlocked as to secure a predetermined sequence of the tripping action of said circuit breakers without use of special time-delay mechanisms.

A particular object of my invention is the arrangement of a system of the above described character in which the secondary circuit breaker, that is the circuit breaker which is farther away from the power generating apparatus, is so interlocked with the primary circuit breaker, which is closer to the power generating apparatus, that the initiation of the opening of the secondary circuit breaker renders the tripping mechanism of the primary circuit breaker inoperative. Prompt localization and isolation in the faulty distribution lines with minimum disturbance to the remainder of the network is thus obtained while securing maximum protection for the entire distribution system.

My invention will be best understood from the accompanying drawing illustrating diagrammatically a distribution system embodying my invention.

The distribution system shown in the drawing comprises, by way of example, a pair of power generating translating apparatus, in the form of rectifiers $a$ connected in parallel to direct-current bus-bars, or a primary power transmission line indicated by a plus sign (+). Three feeders, or secondary transmission lines $b$ derive power from the bus-bars for supplying the same to loads connected to said feeders. The rectifiers are supplied by suitable transformers as is familiar in the art.

The individual rectifiers $a$ are individually connected to the bus-bars through overload circuit breakers $f$, while the feeders are individually connected to the bus-bars through overload circuit breakers $c$. The circuit breakers $f$ interconnecting the rectifiers or translating apparatus to the bus-bars may be designated as primary circuit breakers, while the circuit breakers connecting the feeders to the bus-bars may be designated as secondary circuit breakers.

As is well known, it is desirable to so regulate the operation of the primary and secondary circuit breakers, or in general, the serially-connected circuit breakers disposed between the power generating apparatus and the load, that in case of a fault on a transmission line, or feeder, the circuit breaker nearest the faulty section of the line should open first, and the circuit breakers which are closer to the power generating apparatus should open only if the circuit breakers that are closer to the fault fail to open. At the same time, it is important that each section of the system should be self protecting, that is, each circuit breaker should be able to open in case excessive current flows into the section of the circuit that is nearest to it.

In the prior-art systems having protective arrangements of the above described character, the individual circuit breakers have been provided with time-delay relays set to trip the circuit breakers at different time-intervals after the occurrence of an overload or short-circuit. Such prior-art arrangements have the disadvantage that the minimum interval for which the time-lag relay can be set is relatively long, with the result that the short-circuit current flowing into the fault may, during the interval between the occurrence of the fault and the actual opening of the circuit breaker, reach an excessive value and endanger the machines and the system.

In the arrangement according to the present invention, the selective operation of the circuit breakers is secured, without recourse to time-lag relays, by so interlocking the circuit breakers that are to operate in succession that the initiation of the opening operation of the circuit breaker that is intended to open first momentarily renders inoperative the tripping mechanism of the circuit breaker that is to open later thereby preventing the circuit breaker which is nearest to the generating apparatus from being opened by reason of a fault in a line section that may be disconnected by a circuit breaker that is nearer to the fault.

An arrangement of such character is illustrated in the distribution system shown in the drawing. To this end each of the primary circuit breakers $f$ is shown provided with a tripping mechanism arranged to be actuated by deenergizing a tripping coil $g$ that is normally energized from a current source $k$, through a circuit that is held closed by a pair of contact members $i$, the opening and closing of which is controlled by an overload coil $h$, connected in series with the associated circuit breaker. As long as the current flowing through the circuit breaker $f$ to the bus-bars, or primary transmission line is not abnormally high, the current through the overload coil $h$ is not sufficient to open the contact members $i$, so that the tripping coil $g$ of the tripping mechanism remains energized, thereby holding the circuit breaker closed. Should, however, a short-circuit, or other similar fault, occur in the bus-bar circuit, or in the loads fed therefrom, causing an excessive current flow through the circuit breaker $f$, the overload coil $h$ will cause the contact members $i$ to be opened, deenergizing the tripping coil $g$, and causing the circuit breaker $f$ to open and to disconnect the power generating apparatus from the faulty network.

The tripping mechanisms for the secondary circuit breakers $c$ which are included in the connections of the feeders, or secondary transmission lines, to the bus-bars, comprise tripping coils $d$ arranged to be actuated by the overload current to initiate the tripping action of the associated circuit breaker and to open the same in case of an overload in the respective lines.

In order to secure the afore-mentioned selective tripping of the primary and secondary circuit breakers, the core of the overload coil $d$ of the secondary circuit breakers is arranged to cause the closure of a pair of contact members $e$ connected in an interlocking circuit paralleling the contact members $i$ which control the tripping of the primary circuit breakers $f$.

The operation of the overload tripping coils $h$ and $d$ of the primary and secondary circuit breakers, respectively, is so arranged that when said coils are simultaneously energized to initiate the tripping actions of the respective circuit breakers, the core which is energized by the tripping coil $d$ of the secondary circuit breaker causes the associated contact members $e$ to be closed or bridged over before the core which is energized by the overload tripping coil $h$ of the primary circuit breaker causes the contact members $i$ of the primary tripping circuit to be opened. The relays for opening and closing contacts $i$ and $e$ may be of any well-known construction, the only requirement being that the relays be so adjusted that when the same are excited simultaneously to the operating point, contacts $e$ are closed before contacts $i$ are opened. For example, the arrangement may be such that the coils $d$ of the secondary circuit breakers close the associated contact members $e$ on the first third of their contact-opening movement, while the cores of the coils $h$ of the primary circuit breaker open the associated contact members $i$ on the last third of the contact-closing movement.

With the foregoing arrangement, selective action of the primary and secondary circuit breakers will be obtained notwithstanding the simultaneous energization of the overload tripping coils $h$ and $d$ of the serially-disposed circuit breakers, since on occurrence of a fault on a feeder $b$ the initial movement of the core $d$ of the secondary circuit breaker controlling the respective feeder will cause the contact members $e$ to be closed, thereby anticipating the action of the overload coil $h$ of the primary circuit breaker $f$, the energization of which would otherwise cause the associated core to open the control circuit of the tripping coil $g$ of said primary circuit breaker. The initiation of the opening of the secondary circuit breaker thus renders the tripping mechanism of the primary circuit breaker momentarily inoperative, leaving the circuit between the generating apparatus and the bus-bars or primary line intact, while having the faulty feeder disconnected from the network.

Assuming for example that the normal current in a feeder is about 500 amperes, and that the normal current from the rectifier apparatus is about 1000 amperes, and that the relays associated with the several circuit breakers are adjusted for double the normal current; then, on occurrence of a network short-circuit tending to draw a current, say of 5000 amperes, the overload coils $h$ and $d$ of the primary and secondary circuit breakers, respectively, are simultaneously energized. However, since the movement of the tripping mechanism of the secondary circuit breaker causes the closing of the interlocking contact members $e$ before the contact members $i$ of the primary tripping circuit have been opened, the primary circuit breaker will remain closed and only the faulty feeder will be disconnected.

On the other hand, if a short-circuit should occur on the bus-bars, or the primary line of the network, the overload coil $h$ of the primary circuit breaker $f$ will become energized and cause the energizing circuits of the tripping coil $g$ to be opened at the contact members $i$, thereby deenergizing the primary tripping coil $g$ and causing the primary circuit breaker to be opened, since in the latter case the secondary circuit breakers have not caused the interlocking contact members $e$ of the primary tripping circuit to become closed.

Various other modifications embodying the principles of my invention as set forth above will suggest themselves to those skilled in the art.

I claim as my invention:

1. In a distribution system, an electrical translating apparatus for supplying electric current, a primary transmission line, a secondary transmission line, a circuit breaker connecting said apparatus to said primary transmission line, a circuit breaker connecting said secondary transmission line to said primary transmission line, each of said circuit breakers having a tripping mechanism independently operated in response to predetermined line conditions for tripping the associated circuit breakers, and interlocking means between said circuit breakers, for rendering the tripping mechanism of said primary circuit breaker inoperative in response to the initiation of the tripping action of said secondary circuit breaker, said interlocking means comprising a circuit for energizing the tripping mechanism of said primary circuit breaker.

2. The combination as defined by claim 1, characterized by the fact that the circuit for energizing the tripping mechanism of the primary circuit breaker is controlled by an element responsive to the current flow through said first circuit breaker, the initiation of the tripping action of said secondary circuit breaker rendering the controlling action of said element inoperative.

3. In an electrical distribution system, a power translating apparatus for supplying electric current, a primary transmission line, a primary circuit breaker connecting said apparatus to said line, a secondary transmission line, a secondary circuit breaker connecting said secondary transmission line to said primary transmission line, a tripping mechanism associated with said primary circuit breaker for tripping the same, a relay associated with said primary circuit breaker for actuating said tripping mechanism in response to predetermined current-flow conditions in said circuit, the tripping mechanism of the said primary circuit breaker having an energizing circuit provided with a pair of control contact members, said relay controlling the closing and opening of said contact members, and means operated by the initiation of the tripping action of said secondary circuit breaker for bridging over said contact members to render the control action of said contact members non-effective.

4. In an electrical transmission system, a supply line, electrical supply means therefor, a supply switch providing connection between said line and said means, a feeder, a feeder switch providing connection between said line and said feeder, means including a normally closed circuit and operable upon opening of said circuit to effect opening operation of said supply switch, means responsive to an abnormal current condition through said supply switch and operable upon occurrence of such condition to open said circuit, and means responsive to an abnormal current condition in said feeder and operable upon occurrence of such condition to render said last-named means noneffective with respect to said circuit.

5. In an electrical system, means operable to influence operating action of the same and including a normally closed circuit, means responsive to an abnormal current condition in one part of said system and operable upon occurrence of such condition to open said circuit, and means responsive to an abnormal current condition in another part of said system and operable upon occurrence of such condition to render said second-named means noneffective with respect to said circuit.

In testimony whereof I have signed my name to this specification.

WERNER WALTY.